(12) United States Patent
Nozawa (10) Patent No.: US 12,176,156 B2
(45) Date of Patent: Dec. 24, 2024

(54) ELECTROLYTIC CAPACITOR FOR HIGH WITHSTAND VOLTAGE

(71) Applicant: RUBYCON CORPORATION, Nagano (JP)

(72) Inventor: Yosuke Nozawa, Nagano (JP)

(73) Assignee: RUBYCON CORPORATION, Nagano (JP)

( * ) Notice: Subject to any disclaimer, the term of this patent is extended or adjusted under 35 U.S.C. 154(b) by 78 days.

(21) Appl. No.: 17/613,187

(22) PCT Filed: Jun. 16, 2020

(86) PCT No.: PCT/JP2020/023491
§ 371 (c)(1),
(2) Date: Nov. 22, 2021

(87) PCT Pub. No.: WO2020/262091
PCT Pub. Date: Dec. 30, 2020

(65) Prior Publication Data
US 2022/0319779 A1    Oct. 6, 2022

(30) Foreign Application Priority Data
Jun. 26, 2019   (JP) ............................... 2019-118448

(51) Int. Cl.
*H01G 9/035*   (2006.01)
*H01G 9/045*   (2006.01)
*H01G 9/145*   (2006.01)

(52) U.S. Cl.
CPC ............. *H01G 9/035* (2013.01); *H01G 9/045* (2013.01); *H01G 9/145* (2013.01)

(58) Field of Classification Search
CPC ......... H01G 9/145; H01G 9/045; H01G 9/035
See application file for complete search history.

(56) References Cited

U.S. PATENT DOCUMENTS 4,509,094 A * 4/1985 Finkelstein ............ H01G 9/022
361/314
4,578,204 A * 3/1986 Anderson .............. H01G 9/022
252/62.2

(Continued)

FOREIGN PATENT DOCUMENTS

JP       57-034326       2/1982
JP       B S628004       9/1982

(Continued)

OTHER PUBLICATIONS

International Search Report for PCT/JP2020/023491 dated Aug. 18, 2020.

*Primary Examiner* — David M Sinclair
(74) *Attorney, Agent, or Firm* — Stephen J. Weyer, Esq.; Stites & Harbison, PLLC (57) ABSTRACT

To provide an electrolytic capacitor having a configuration that achieves a low impedance by increasing the content of water, satisfies a withstand voltage of 400 V or more, and is capable of enhancing the long-term reliability. Provided as a solution is an electrolytic capacitor (1) including an electrolytic solution (2e) containing ethylene glycol, 10 to 30% by mass of water, and 1 to 12% by mass of an amine salt of a carboxylic acid, having added thereto 0.01 to 2% by mass of one or more kind of ammonium hypophosphite, an amine salt of hypophosphorous acid, and hypophosphorous acid, the carboxylic acid being a polycarboxylic acid having a chain hydrocarbon skeleton and a molecular weight of 140 to 500.

4 Claims, 2 Drawing Sheets

(56) References Cited

U.S. PATENT DOCUMENTS

| | | | | |
|---|---|---|---|---|
| 7,585,428 B1* | 9/2009 | Marshall | ............... | H01G 9/035 |
| | | | | 252/62.2 |
| 2003/0142464 A1* | 7/2003 | Liu | ......................... | H01G 9/15 |
| | | | | 252/62.2 |
| 2004/0262566 A1* | 12/2004 | Takaoka | ................. | H01G 9/035 |
| | | | | 252/500 |
| 2016/0148756 A1* | 5/2016 | Wada | ..................... | H01G 11/62 |
| | | | | 252/62.2 |
| 2021/0335554 A1* | 10/2021 | Shimizu | ................ | H01G 9/052 |

FOREIGN PATENT DOCUMENTS

| | | | | |
|---|---|---|---|---|
| JP | H 06151251 | 5/1994 | | |
| JP | 2002-270473 | 9/2002 | | |
| JP | 2005-019773 | 1/2005 | | |
| JP | 2005-039245 | 2/2005 | | |
| JP | 2011-071238 | 4/2011 | | |
| WO | WO-2007058204 A1 * | 5/2007 | ............ | H01G 9/008 |

* cited by examiner

ELECTROLYTIC CAPACITOR FOR HIGH WITHSTAND VOLTAGE

TECHNICAL FIELD

The present invention relates to an electrolytic capacitor.

BACKGROUND ART

An electrolytic capacitor has, for example, a configuration having formed therein a capacitor element including an anode foil and a cathode foil, which each are electrically connected to a terminal, with a separator intervening therebetween, and an electrolytic solution introduced to the capacitor element. An aluminum electrolytic capacitor uses, as a dielectric material, an oxide film formed on the surface of an aluminum foil through an electrochemical surface treatment, and is excellent in self-repairing capability.

For example, there is an increasing demand of an electrolytic capacitor for medium and high voltage for the purposes of an LED illumination and a power circuit. The electrolytic capacitor for medium and high voltage is being demanded to achieve both a low impedance and high reliability.

An electrolytic solution of an electrolytic capacitor has been proposed that has a configuration containing ethylene glycol as a main solvent, and containing 5 to 7% by weight of water and 7 to 15% by weight of ammonium adipate, to which 0.2 to 0.5% by weight of hypophosphorous acid is added (PTL 1: JP-B-62-8004). An electrolytic solution of an electrolytic capacitor has been proposed that has a configuration containing ethylene glycol as a main solvent, and containing 5 to 10% by weight of water, 5 to 10% by weight of ammonium benzoate, and 0.5 to 2% by weight of ammonium p-nitrobenzoate, to which 0.5 to 4% by weight of ammonium hypophosphite is added (PTL 2: JP-A-6-151251). An electrolytic capacitor has been proposed that includes an electrolytic solution containing ethylene glycol, and containing 10 to 50% by weight of water and 10% by weight of triethylamine benzoate (PTL 3: JP-A-2002-270473).

An electrolytic capacitor has been proposed that includes an electrolytic solution containing ethylene glycol as a main solvent, and containing 5 to 20% by mass of water and 14 to 22% by mass of diethylamine azelate (PTL 4: JP-A-2011-071238). An electrolytic solution has been proposed that has a configuration containing ethylene glycol as a main solvent, and containing 20% by weight of water, 10% by weight of a triethylamine salt, and 5% by weight of ammonium adipate, to which 0.5% by weight of ammonium hypophosphite is added, and 0.3% by weight of tributyl phosphate is added (PTL 5: JP-A-2005-039245).

CITATION LIST

Patent Literatures

PTL 1: JP-B-62-8004
PTL 2: JP-A-6-151251
PTL 3: JP-A-2002-270473
PTL 4: JP-A-2011-071238
PTL 5: JP-A-2005-039245

SUMMARY OF INVENTION

Technical Problem

However, the configurations of PTLs 1 to 3 each have an issue in which in increasing the content of water, the anode foil and the cathode foil of the electrolytic capacitor undergo hydration reaction at a high temperature to generate gas, which tends to lead a malfunction due to the increase of the internal pressure, and deterioration of the capacitor characteristics due to deterioration of the anode foil and the cathode foil, resulting in shortening of the lifetime of the electrolytic capacitor. In this point of view, the configurations of PTLs 4 and 5 are excellent in thermal stability as compared to the configurations of PTLs 1 to 3 since the configuration of PTL 4 uses diethylamine azelate as an electrolyte, and the configuration of PTL 5 uses a triethylamine salt is used as an electrolyte. Furthermore, diethylamine azelate or a triethylamine salt contained suppresses, to a certain extent, the hydration reaction of the electrode foils (particularly the cathode foil) due to a large amount of water. However, it has been found that the configurations of PTLs 4 and 5 fail to achieve both a good chemical conversion capability and a high withstand voltage, and issues including a malfunction due to the progress of the deterioration of the anode foil and the shortage of the withstand voltage occur depending on the use condition of the electrolytic capacitor.

In recent years, there is an increasing demand of an electrolytic capacitor that has a high withstand voltage and a long lifetime simultaneously. In particular, the market demands an electrolytic capacitor having a configuration that has a withstand voltage of 400 V or more and retains good characteristics over a wide temperature range even after allowing to stand under no load at a high temperature. However, the current situation is that the electrolytic capacitors according to the ordinary techniques of PTLs 1 to 5 cannot satisfy such a high degree of demand.

Solution to Problem

The present invention has been made under the circumstances, and one or more aspects of the present invention are directed to an electrolytic capacitor having a configuration that achieves a low impedance by increasing the content of water, satisfies a withstand voltage of 400 V or more, and is capable of enhancing the long-term reliability.

The present invention has been accomplished under the solutions as disclosed below.

An electrolytic capacitor according to one aspect of the present invention includes a capacitor element including an anode foil having formed thereon an oxide film, a cathode foil, and a separator disposed between the anode foil and the cathode foil, and an electrolytic solution introduced to the capacitor element, the electrolytic solution containing ethylene glycol, 10 to 30% by mass of water, and 1 to 12% by mass of an amine salt of a carboxylic acid, having added thereto 0.01 to 2% by mass of one or more kind of ammonium hypophosphite, an amine salt of hypophosphorous acid, and hypophosphorous acid, the carboxylic acid being a polycarboxylic acid having a chain hydrocarbon skeleton and a molecular weight of 140 to 500.

According to the configuration, the impedance can be sufficiently lowed since the content of water is 10% by mass or more, and the malfunction due to the increase of the internal pressure caused by the gas generated through hydration reaction of the electrode foils at a high temperature can be prevented since the content of water is 30% by mass or less, and the progress of the deterioration of the characteristics due to the deterioration of the electrode foils can be suppressed. Furthermore, the configuration can satisfy a withstand voltage of 400 V or more since the polycarboxylic acid having a chain hydrocarbon skeleton and a molecular weight of 140 to 500 is used, and simultaneously the content of the amine salt of the polycarboxylic acid is 1 to 12% by mass. Moreover, since 0.01 to 2% by mass of one or more kind of ammonium hypophosphite, an amine salt of hypophosphorous acid, and hypophosphorous acid is added, the adsorption and protection function for the anode foil and the cathode foil can be sufficiently achieved, hypophosphorous acid or a salt thereof can be prevented from becoming excessive, and the enhancement of the chemical conversion capability can be contributed thereby.

Advantageous Effects of Invention

The present invention can achieve the electrolytic capacitor having the configuration in which the impedance can be decreased since the content of water in the electrolytic solution is increased within the appropriate range, and a high withstand voltage and a good chemical conversion capability can be achieved to provide good lifetime characteristics by the effect of suppressing the deterioration of the anode foil and the cathode foil since the concentration of the amine salt of the polycarboxylic acid is appropriately decreased, and hypophosphorous acid or a salt thereof is added. Accordingly, an electrolytic capacitor having a configuration that can satisfy all a low impedance, a high withstand voltage, and a long lifetime can be realized.

DESCRIPTION OF EMBODIMENTS

Figure 3:
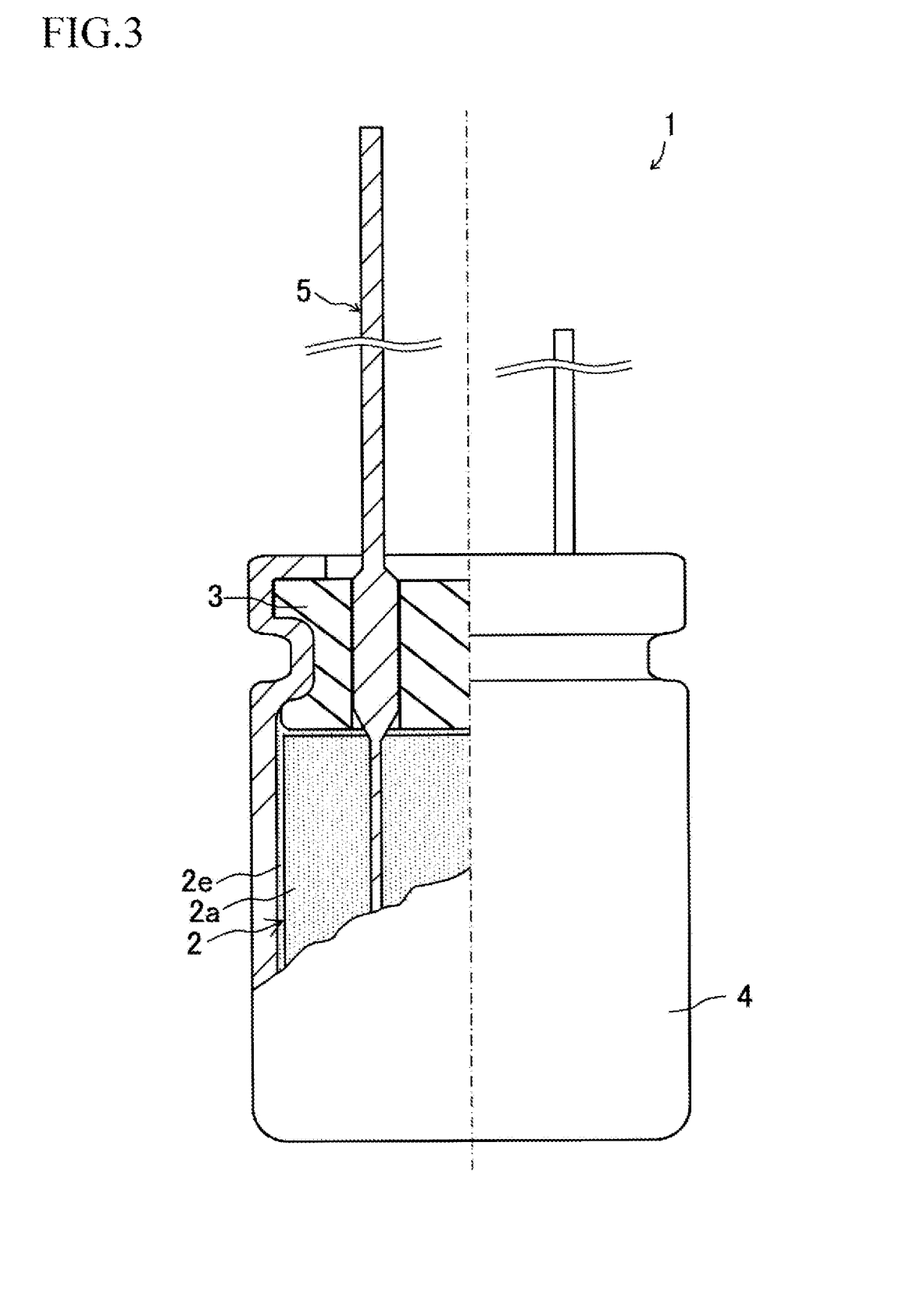
FIG. 3 is a partial cross-section view showing a schematic structure of an electrolytic capacitor according to the embodiment of the present invention.

Embodiments of the present invention will be described in detail below. As shown in FIG. 3, an electrolytic capacitor 1 includes a winding capacitor element 2 having an electrolytic solution 2e introduced thereto, lead terminals 5, a sealing part 3 having through holes formed in two positions, and a case 4 having a bottomed shape for housing the capacitor element 2, and has a structure in which opening side of the case 4 is sealed with the sealing part 3. The case 4 has a bottomed shape and formed of a metal, such as aluminum. The sealing part 3 has high airtightness for preventing the invasion of water and the scatter of an oxide film repairing substance, and has a substantially cylindrical shape corresponding to the inner shape of the case 4.

An anode foil 2a is formed of a valve metal, such as aluminum, and the surface thereof is roughened through an etching treatment, on which an oxide film is then formed through a chemical conversion treatment. A cathode foil is formed of a valve metal, such as aluminum, and the surface thereof is roughened through an etching treatment, on which an oxide film is then formed through spontaneous oxidation or a chemical conversion treatment.

In the present embodiment, for example, the anode foil 2a used is an aluminum foil having a product of the film withstand voltage and the capacitance per unit projected area of 300 V·µF/cm² or more. According to the configuration, an electrolytic capacitor having a small size and/or a high capacity can be realized, and the size thereof can be reduced while retaining the low impedance by increasing the content of water in the electrolytic solution. Furthermore, the effect of enhancing the oxide film repairing capability of the electrolytic solution 2e can be expected particularly in the vicinity of the anode foil. In consideration of these advantages, the product of the film withstand voltage and the capacitance per unit projected area of the anode foil 2a may be 350 V·µF/cm² or more, and may be 400 V·µF/cm² or more. The film withstand voltage and the capacitance of the aluminum foil herein are values according to the method described in EIAJ RC-2364A.

A separator capable of retaining the electrolytic solution formed of a known material is disposed between the anode foil 2a and the cathode foil. The electrolytic capacitor 2 is impregnated with the electrolytic solution 2e.

The electrolytic solution 2e has a configuration containing ethylene glycol, 10 to 30% by mass of water, and 1 to 12% by mass of an amine salt of a polycarboxylic acid, having added thereto 0.01 to 2% by mass of hypophosphorous acid or a salt thereof, and the polycarboxylic acid has a chain hydrocarbon skeleton and a molecular weight of 140 to 500. The electrolytic solution 2e contained achieves the electrolytic capacitor 1 having a configuration satisfying all a low impedance, a high withstand voltage, and a long lifetime.

For further enhancing the effect of suppressing the hydration reaction of the electrode foils while retaining the low impedance, the content of the amine salt of the polycarboxylic acid in the electrolytic solution 2e may be 3% by mass or more in some cases, may be 6% by mass or more in some cases, and may be 9% by mass or more in some cases.

Cases where the content of the amine salt of the polycarboxylic acid is less than 1% by mass have been tried to evaluate, but the specific resistance of the electrolytic solution is increased, and the impedance cannot be sufficiently decreased. As a result of the evaluation for cases where the content of the amine salt of the polycarboxylic acid exceeds 12% by mass, it has been found that the function enhancing the chemical conversion capability cannot be largely expected through the addition of hypophosphorous acid or a salt thereof to the electrolytic solution (see Reference Examples 1 and 2 described later).

For further decreasing the impedance, the content of water in the electrolytic solution 2e may be 13% by mass or more in some cases, and may be 16% by mass or more in some cases. For achieving both a good chemical conversion capability and a high withstand voltage, the content of water in electrolytic solution 2e may be 25% by mass or less in some cases, and may be 20% by mass or less in some cases.

Cases where the content of water is less than 10% by mass have been tried to evaluate, but the specific resistance of the electrolytic solution is increased, and the impedance cannot be sufficiently decreased. As a result of the evaluation for cases where the content of water exceeding 30% by mass, the reduction rate of 400 V arrival time becomes a negative value (see Reference Examples 3 and 4 described later).

The amine salt of the polycarboxylic acid may be, for example, one or more kind selected from dimethylamine adipate, diethylamine adipate, dimethylamine azelate, diethylamine azelate, dimethylamine sebacate, diethylamine sebacate, ethyldimethylamine sebacate, dimethylamine 2-methylnonanedioate, diethylamine 2-methylnonanedioate, dimethylamine 3-tert-butylhexanedioate, diethylamine 3-tert-butylhexanedioate, dimethylamine 1,6-decanedicarboxylate, diethylamine 1,6-decanedicarboxylate, dimethylamine brassylate, dimethylamine octadecenedioate, diethylamine octadecenedioate, ethyldimethylamine octadecenedioate, dimethylamine 12-vinyl-8-octadecenedioate, dimethylamine dimethyloctadecadienetetracarboxylate, diethylamine dimethyloctadecadienetetracarboxylate, and other known amine salts of polycarboxylic acids.

Examples of the polycarboxylic acid having a chain hydrocarbon skeleton and a molecular weight of 140 to 500 include adipic acid (molecular weight: 146.1), azelaic acid (molecular weight: 188.2), sebacic acid (molecular weight: 202.3), 1,6-decanedicarboxylic acid (molecular weight: 230.3), 5,6-decanedicarboxylic acid (molecular weight: 230.3), 1,10-decanedicarboxylic acid (molecular weight: 230.3), 2-methylnonanedioic acid (molecular weight: 202.3), 4-methylnonanedioic acid (molecular weight: 202.3), 3-tert-butylhexanedioic acid (molecular weight: 202.3), 2,4-dimethyl-4-methoxycarbonylundecanedioic acid (molecular weight: 302.4), 2,4,6-trimethyl-4,6-dimethoxycarbonyltridecanedioic acid (molecular weight: 402.5), 8,9-dimethyl-8,9-dimethoxycarbonylhexadecanedioic acid (molecular weight: 430.5), and dimethyloctadecanetetracarboxylic acid (molecular weight: 458.6).

Polycarboxylic acids each having a chain hydrocarbon skeleton and a molecular weight of 140 to 500 may also be applied in addition to the above.

The molecular weight of the polycarboxylic acid is more preferably 240 or less in consideration of the solubility in ethylene glycol or water and the low impedance characteristics.

Cases where the molecular weight of the polycarboxylic acid is less than 140 have been evaluated, but sufficient withstand voltage characteristics cannot be obtained. The production for the cases where the molecular weight of the polycarboxylic acid exceeds 500 has been tried, but the sufficient solubility cannot be retained at a low temperature, and the specific resistance of the electrolytic solution is increased, failing to decrease the impedance sufficiently.

The amount of one or more kind of ammonium hypophosphite, an amine salt of hypophosphorous acid, and hypophosphorous acid added is more effectively in a range of 0.03 to 1.5% by mass, and further effectively in a range of 0.05 to 1% by mass.

Cases where the content of hypophosphorous acid or a salt thereof is less than 0.01% by mass have been evaluated, but the sufficient effect of enhancing the chemical conversion capability cannot be obtained. Cases where the content of hypophosphorous acid or a salt thereof exceeds 2% by mass have been evaluated, but the further effect of enhancing the chemical conversion capability is poor, and the sufficient withstand voltage characteristics cannot be obtained.

A withstand voltage improver, such as a polyether based compound, may be added to the electrolytic solution 2e in some cases for stabilizing the withstand voltage characteristics. Examples of the polyether based withstand voltage improver include polyethylene glycol, polypropylene glycol, and other known polyether based withstand voltage improvers, which include a branched polyether. A withstand voltage improver other than above may be added to the electrolytic solution 2e in some cases, and examples thereof include polyvinyl alcohol, polysiloxane, a sugar alcohol (such as mannitol), and other known withstand voltage improvers. One or more kind of the withstand voltage improver may be added in some cases.

In addition to one or more kind of ammonium hypophosphite, an amine salt of hypophosphorous acid, and hypophosphorous acid, a phosphorus based compound other than these may be added to the electrolytic solution 2e in some cases for further stabilizing the chemical conversion capability. Examples of the phosphorus based compound other than hypophosphorous acid or a salt thereof include phosphoric acid or a salt thereof (such as phosphoric acid, ammonium phosphate, and an amine salt of phosphoric acid), phosphorous acid or a salt thereof (such as phosphorous acid, ammonium phosphite, and an amine salt of phosphorous acid), a phosphate ester (such as a methylphosphate ester, an ethylphosphate ester, a dimethylphosphate ester, a diethylphosphate ester, a trimethylphosphate ester, and a triethylphosphate ester), and other known phosphorus based compounds. In particular, the addition of phosphoric acid or a salt in addition to hypophosphorous acid or a salt thereof is more preferred since an excellent function suppressing the hydration reaction of the anode foil and the cathode foil can be obtained.

An aromatic nitro compound may be added to the electrolytic solution 2e in addition to the aforementioned compounds in some cases. The aromatic nitro compound may be, for example, one or more kind selected from nitroacetophenone, nitrobenzoic acid, nitrobenzyl alcohol, nitrophenol, nitrobenzene, nitroxylene, and other known aromatic nitro compounds.

Examples of the electrolyte used in the electrolytic solution 2e include an ammonium salt in addition to the amine salt. For enhancing the thermal stability and further enhancing the effect of suppressing the deterioration of the electrode foils, the content of the entire ammonium salts in the electrolytic solution 2e may be 5% by mass or less in some cases, may be 4% by mass or less in some cases, and may be 3% by mass or less in some cases. For further stabilizing the good withstand voltage characteristics, the total content of the entire amine salts and the entire ammonium salts in the electrolytic solution 2e may be 15% by mass or less in some cases.

Subsequently, examples according to the present embodiment, reference examples, and comparative examples of the electrolytic solution, and the capability evaluation results necessary for applying these electrolytic solutions to electrolytic capacitors will be described below.

Examples 1 to 6

The electrolytic solutions 2e of Examples 1 to 6 each contained ethylene glycol, water, and 1 to 12% by mass of an amine salt of a polycarboxylic acid, to which 0.01 to 2% by mass of hypophosphorous acid or a salt thereof was added. The electrolytic solutions 2e produced for the examples each were subjected to the sparking voltage measurement for evaluating the 400 V arrival time (second) and the maximum achieving voltage (V). The compositions and the capability evaluation results of the electrolytic solutions are shown in Table 1 below.

TABLE 1

|  | Example 1 | Example 2 | Example 3 | Example 4 | Example 5 | Example 6 |
|---|---|---|---|---|---|---|
| Ethylene glycol [wt %] | 78.2 | 76.2 | 73.2 | 70.2 | 67.2 | 65.2 |
| Water [wt %] | 10.0 | 10.0 | 10.0 | 10.0 | 10.0 | 15.0 |
| Dimethylamine azelate [wt %] | 1.0 | 3.0 | 6.0 | 9.0 | 12.0 | 9.0 |
| Polyether based additive [wt %] | 10.0 | 10.0 | 10.0 | 10.0 | 10.0 | 10.0 |
| Phosphoric acid [wt %] | 0.5 | 0.5 | 0.5 | 0.5 | 0.5 | 0.5 |
| Ammonium hypophosphite [wt %] | 0.3 | 0.3 | 0.3 | 0.3 | 0.3 | 0.3 |
| 400 V arrival time [second] | 146 | 142 | 150 | 146 | 147 | 160 |
| Maximum achieving voltage [V] | 520 | 476 | 463 | 450 | 442 | 448 |

Reference Examples 1 and 2

The electrolytic solutions of Reference Examples 1 and 2 each contained ethylene glycol, water, and 14 to 20% by mass of an amine salt of a polycarboxylic acid, to which 0.01 to 2% by mass of hypophosphorous acid or a salt thereof was added. The electrolytic solutions produced for the reference examples each were subjected to the sparking voltage measurement for evaluating the 400 V arrival time (second) and the maximum achieving voltage (V). The compositions and the capability evaluation results of the electrolytic solutions are shown in Table 2 below.

TABLE 2

|  | Reference Example 1 | Reference Example 2 |
|---|---|---|
| Ethylene glycol [wt %] | 65.2 | 59.2 |
| Water [wt %] | 10.0 | 10.0 |
| Dimethylamine azelate [wt %] | 14.0 | 20.0 |
| Polyether based additive [wt %] | 10.0 | 10.0 |
| Phosphoric acid [wt %] | 0.5 | 0.5 |
| Ammonium hypophosphite [wt %] | 0.3 | 0.3 |
| 400 V arrival time [second] | 148 | 154 |
| Maximum achieving voltage [V] | 421 | 409 |

Comparative Examples 1 to 8

The electrolytic solutions of Comparative Examples 1 to 8 each contained ethylene glycol, water, and 1 to 20% by mass of an amine salt of a polycarboxylic acid. However, hypophosphorous acid or a salt thereof was not added. The electrolytic solutions produced for the comparative examples each were subjected to the sparking voltage measurement for evaluating the 400 V arrival time (second) and the maximum achieving voltage (V). The compositions and the capability evaluation results of the electrolytic solutions are shown in Tables 3 and 4 below.

TABLE 3

|  | Comparative Example 1 | Comparative Example 2 | Comparative Example 3 | Comparative Example 4 | Comparative Example 5 | Comparative Example 6 |
|---|---|---|---|---|---|---|
| Ethylene glycol [wt %] | 78.5 | 76.5 | 73.5 | 70.5 | 67.5 | 65.5 |
| Water [wt %] | 10.0 | 10.0 | 10.0 | 10.0 | 10.0 | 15.0 |
| Dimethylamine azelate [wt %] | 1.0 | 3.0 | 6.0 | 9.0 | 12.0 | 9.0 |
| Polyether based additive [wt %] | 10.0 | 10.0 | 10.0 | 10.0 | 10.0 | 10.0 |
| Phosphoric acid [wt %] | 0.5 | 0.5 | 0.5 | 0.5 | 0.5 | 0.5 |
| 400 V arrival time [second] | 1096 | 971 | 557 | 328 | 213 | 375 |
| Maximum achieving voltage [V] | 597 | 496 | 460 | 453 | 436 | 437 |

TABLE 4

|  | Comparative Example 7 | Comparative Example 8 |
|---|---|---|
| Ethylene glycol [wt %] | 65.5 | 59.5 |
| Water [wt %] | 10.0 | 10.0 |
| Dimethylamine azelate [wt %] | 14.0 | 20.0 |
| Polyether based additive [wt %] | 10.0 | 10.0 |
| Phosphoric acid [wt %] | 0.5 | 0.5 |
| 400 V arrival time [second] | 180 | 168 |
| Maximum achieving voltage [V] | 420 | 416 |

Figure 1:
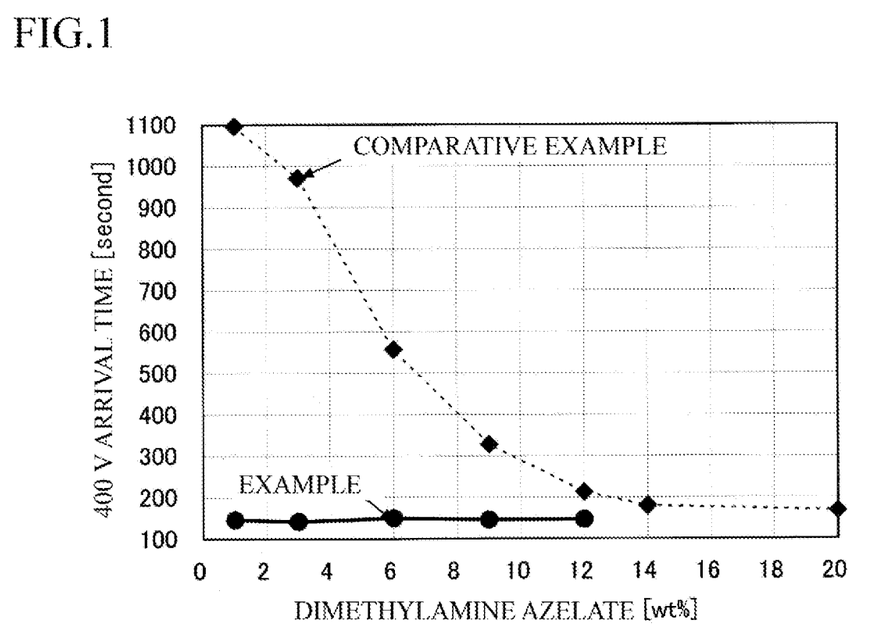
FIG. 1 is a graph showing the comparison of relationship between the content of an amine salt of polycarboxylic acid in an electrolytic solution and the 400 V arrival time in the sparking voltage measurement test at an ordinary temperature for examples according to an embodiment of the present invention and comparative examples.

FIG. 1 is a graph showing the comparison of the relationship between the content of the amine salt of the polycarboxylic acid in the electrolytic solution and the 400 V arrival time for Examples 1 to 5, Comparative Examples 1 to 5, and Comparative Examples 7 and 8 above.

According to Tables 1, 3, and 4 and FIG. 1, Examples 1 to 5 having various contents of the amine salt of the polycarboxylic acid each arrive at a voltage of 400 V in a short period of time, and are stable with a small fluctuation in arrival time. On the other hand, Comparative Examples 1 to 5 and Comparative Example 6 each have an extremely increased 400 V arrival time when the content of the amine salt of the polycarboxylic acid is 14% by mass or less, and are unstable with a large fluctuation in arrival time. Examples 1 to 5 and Example 6 each have a largely shortened 400 V arrival time, as compared to Comparative Examples 1 to 5 and Comparative Example 6. Furthermore, Examples 1 to 5 each have a shortened 400 V arrival time, as compared to Comparative Examples 7 and 8. Accordingly, in the case where the content of the amine salt of the polycarboxylic acid in the electrolytic solution is 1 to 12% by mass, the effect of the function enhancing the chemical conversion capability due to the addition of hypophosphorous acid or a salt thereof to the electrolytic solution is significant.

According to Tables 2 and 4, Reference Example 1 and Reference Example 2 each have a 400 V arrival time that is shortened by less than 20%, as compared to Comparative Examples 7 and 8. It has been found therefrom that in the case where the content of the amine salt of the polycarboxylic acid in the electrolytic solution exceeds 12% by mass, the function enhancing the chemical conversion capability cannot be largely expected even though hypophosphorous acid or a salt thereof is added to the electrolytic solution.

Cases where the content of the amine salt of the polycarboxylic acid was less than 1% by mass were tried to evaluate, but the specific resistance of the electrolytic solution was increased, and the impedance was not sufficiently decreased. Cases where the content of hypophosphorous acid or a salt thereof was less than 0.01% by mass were evaluated, but the sufficient effect of enhancing the chemical conversion capability was not obtained. Cases where the content of hypophosphorous acid or a salt thereof exceeded 2% by mass were evaluated, but the further effect of enhancing the chemical conversion capability was poor, and the sufficient withstand voltage characteristics were not obtained.

Examples 7 and 8

The electrolytic solutions of Examples 7 and 8 each contained ethylene glycol, water, and 1 to 12% by mass of an amine salt of a polycarboxylic acid, to which 0.01 to 2% by mass of hypophosphorous acid or a salt thereof was added. The electrolytic solutions 2e produced for the examples each were subjected to the sparking voltage measurement for evaluating the 400 V arrival time (second) and the maximum achieving voltage (V). The compositions and the capability evaluation results of the electrolytic solutions are shown in Table 5 below.

TABLE 5

|  | Example 7 | Example 8 |
|---|---|---|
| Ethylene glycol [wt %] | 73.0 | 73.5 |
| Water [wt %] | 10.0 | 10.0 |
| Dimethylamine azelate [wt %] | 6.0 | 6.0 |
| Polyether based additive [wt %] | 10.0 | 10.0 |
| Phosphoric acid [wt %] | 0.5 | 0.0 |
| Hypophosphorous acid [wt %] | 0.5 | 0.5 |
| 400 V arrival time [second] | 160 | 175 |
| Maximum achieving voltage [V] | 443 | 441 |

Comparative Examples 9 and 10

The electrolytic solutions of Comparative Examples 9 and 10 each contained ethylene glycol, water, and 1 to 12% by mass of an amine salt of a polycarboxylic acid. However, hypophosphorous acid or a salt thereof was not added. The electrolytic solutions produced for the comparative examples each were subjected to the sparking voltage measurement for evaluating the 400 V arrival time (second) and the maximum achieving voltage (V). The compositions and the capability evaluation results of the electrolytic solutions are shown in Table 6 below.

TABLE 6

|  | Comparative Example 9 | Comparative Example 10 |
|---|---|---|
| Ethylene glycol [wt %] | 73.0 | 73.0 |
| Water [wt %] | 10.0 | 10.0 |
| Dimethylamine azelate [wt %] | 6.0 | 6.0 |
| Polyether based additive [wt %] | 10.0 | 10.0 |
| Phosphoric acid [wt %] | 0.5 | 1.0 |
| Phosphorous acid [wt %] | 0.5 | 0.0 |
| 400 V arrival time [second] | 1393 | 518 |
| Maximum achieving voltage [V] | 453 | 441 |

Examples 7 and 8 and Comparative Examples 9 and 10 have in common that the electrolytic solution contains 6% by mass of dimethylamine azelate in the solvent containing ethylene glycol and water. The electrolytic solutions of Comparative Examples 9 and 10 are different from the electrolytic solution of Example 7 in that phosphoric acid or phosphorous acid is added instead of hypophosphorous acid.

According to Tables 5 and 6, Examples 7 and 8 having hypophosphorous acid added each have a largely shortened 400 V arrival time, as compared to Comparative Example 9 having phosphorous acid added but no hypophosphorous acid added and Comparative Example 10 having phosphoric acid added but no hypophosphorous acid added. Accordingly, the significant effect of the function enhancing the chemical conversion capability can be obtained through the synergistic effect of the content of the amine salt of the polycarboxylic acid of 1 to 12% by mass in the electrolytic solution and the addition of 0.01 to 2% by mass of one or more of ammonium hypophosphite, an amine salt of hypophosphorous acid, and hypophosphorous acid thereto.

On the other hand, even in the case where the content of the amine salt of the polycarboxylic acid is 1 to 12% by mass, phosphorous acid and phosphoric acid cannot be a substitute of hypophosphorous acid or a salt thereof, and therefore the effect enhancing the chemical conversion capability cannot be largely expected. Furthermore, Example 7 having both hypophosphorous acid and phosphoric acid added has a further shortened 400 V arrival time, as compared to Example 8 having hypophosphorous acid added but no phosphoric acid added. Accordingly, the more significant effect of the function enhancing the chemical conversion capability can be obtained through the synergistic effect of the content of the amine salt of the polycarboxylic acid of 1 to 12% by mass in the electrolytic solution and the addition of both hypophosphorous acid or a salt thereof and phosphoric acid or a salt thereof thereto.

Figure 2:
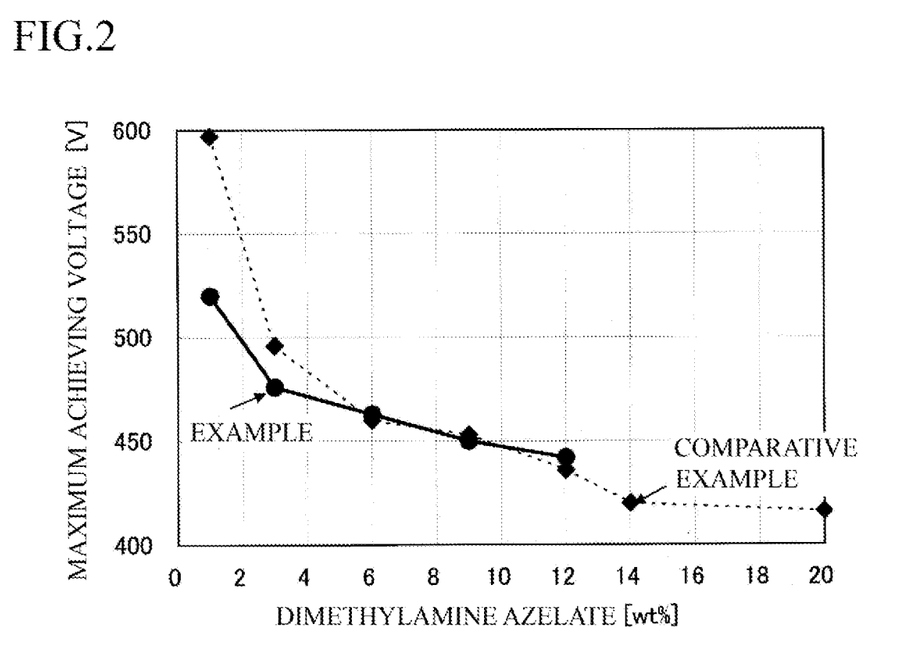
FIG. 2 is a graph showing the comparison of the relationship between the content of the amine salt of the polycarboxylic acid in the electrolytic solution and the maximum achieving voltage in the sparking voltage measurement test at ordinary temperature for the examples according to the embodiment of the present invention and the comparative examples.

FIG. 2 is a graph showing the comparison of the relationship between the content of the amine salt of the polycarboxylic acid in the electrolytic solution and the maximum achieving voltage for Examples 1 to 5, Comparative Examples 1 to 5, and Comparative Examples 7 and 8 above. For example, an electrolytic capacitor having a withstand voltage of 400 V or more can be realized with a maximum achieving voltage of 440 V or more. For example, the rated voltage of the electrolytic capacitor can be set to 400 V or more with a maximum achieving voltage of 440 V or more.

According to Tables 1, 3, and 4 and FIG. 2, Examples 1 to 5 each have a maximum achieving voltage of 440 V or more. Comparative Examples 1 to 4 each have a maximum achieving voltage of 440 V or more. However, Comparative Examples 5, 7, and 8 each have a maximum achieving voltage lower than 440 V. Accordingly, the maximum achieving voltage can be 440 V or more, and the 400 V arrival time can be largely shortened as described above, by adding hypophosphorous acid or a salt thereof to the electrolytic solution, and regulating the content of the amine salt of the polycarboxylic acid in the electrolytic solution to 1 to 12% by mass.

Subsequently, examples and comparative examples with a variety of the amine salts of the polycarboxylic acids, and the capability evaluation results necessary for applying the electrolytic solutions according thereto to electrolytic capacitors will be described below.

Examples 9 to 27

The electrolytic solutions 2e of Examples 9 to 27 each contained ethylene glycol, 10% by mass of water, and 6% by mass of a variety of amine salts of polycarboxylic acids, to which 0.3% by mass of hypophosphorous acid or a salt thereof was added. The electrolytic solutions 2e produced for the examples each were subjected to the sparking voltage measurement for evaluating the 400 V arrival time (second)

and the maximum achieving voltage (V). The compositions and the capability evaluation results of the electrolytic solutions are shown in Table 7 below.

TABLE 7

| | Amine salt of polycarboxylic acid | 400 V arrival time [second] | Maximum achieving voltage [V] |
|---|---|---|---|
| Example 9 | Dimethylamine adipate | 148 | 455 |
| Example 10 | Diethylamine adipate | 150 | 454 |
| Example 11 | Diethylamine azelate | 151 | 479 |
| Example 12 | Dimethylamine sebacate | 149 | 455 |
| Example 13 | Diethylamine sebacate | 151 | 462 |
| Example 14 | Ethyldimethylamine sebacate | 145 | 494 |
| Example 15 | Dimethylamine 2-methylnonanedioate | 148 | 456 |
| Example 16 | Diethylamine 2-methylnonanedioate | 146 | 460 |
| Example 17 | Dimethylamine 3-tert-butylhexanedioate | 145 | 472 |
| Example 18 | Diethylamine 3-tert-butylhexanedioate | 150 | 475 |
| Example 19 | Dimethylamine 1,6-decanedicanboxylate | 156 | 476 |
| Example 20 | Diethylamine 1,6-decanedicarboxylate | 146 | 476 |
| Example 21 | Dimethylamine brassylate | 136 | 472 |
| Example 22 | Dimethylamine octadecenedioate | 147 | 470 |
| Example 23 | Diethylamine octadecenedioate | 144 | 491 |
| Example 24 | Ethyldimethylamine octadecenedioate | 151 | 499 |
| Example 25 | Dimethylamine 12-vinyl-8-octadecenedioate | 150 | 485 |
| Example 26 | Dimethylamine dimethyloctadecadienetetracarboxylate | 146 | 460 |
| Example 27 | Diethylamine dimethyloctadecadienetetracarboxylate | 137 | 490 |

Comparative Examples 11 to 29

The electrolytic solutions of Comparative Examples 11 to 29 each contained ethylene glycol, 10% by mass of water, and 6% by mass of a variety of amine salts of polycarboxylic acids. However, hypophosphorous acid or a salt thereof was not added. The electrolytic solutions produced for the comparative examples each were subjected to the sparking voltage measurement for evaluating the 400 V arrival time (second) and the maximum achieving voltage (V). The compositions and the capability evaluation results of the electrolytic solutions are shown in Table 8 below.

TABLE 8

| | Amine salt of polycarboxylic acid | 400 V arrival time [second] | Maximum achieving voltage [V] |
|---|---|---|---|
| Comparative Example 11 | Dimethylamine adipate | 540 | 453 |
| Comparative Example 12 | Diethylamine adipate | 791 | 469 |
| Comparative Example 13 | Diethylamine azelate | 898 | 480 |
| Comparative Example 14 | Dimethylamine sebacate | 730 | 478 |
| Comparative Example 15 | Diethylamine sebacate | 710 | 480 |
| Comparative Example 16 | Ethyldimethylamine sebacate | 578 | 531 |
| Comparative Example 17 | Dimethylamine 2-methylnonanedioate | 520 | 475 |
| Comparative Example 18 | Diethylamine 2-methylnonanedioate | 724 | 483 |
| Comparative Example 19 | Dimethylamine 3-tert-butylhexanedioate | 492 | 489 |
| Comparative Example 20 | Diethylamine 3-tert-butylhexanedioate | 827 | 499 |
| Comparative Example 21 | Dimethylamine 1,6-decanedicarboxylate | 474 | 483 |
| Comparative Example 22 | Diethylamine 1,6-decanedicarboxylate | 894 | 505 |
| Comparative Example 23 | Dimethylamine brassylate | 954 | 533 |
| Comparative Example 24 | Dimethylamine octadecenedioate | 947 | 507 |
| Comparative Example 25 | Diethylamine octadecenedioate | 962 | 531 |
| Comparative Example 26 | Ethyldimethylamine octadecenedioate | 1069 | 533 |
| Comparative Example 27 | Dimethylamine 12-vinyl-8-octadecenedioate | 1050 | 484 |
| Comparative Example 28 | Dimethylamine dimethyloctadecadienetetracarboxylate | 1078 | 435 |

TABLE 8-continued

| | Amine salt of polycarboxylic acid | 400 V arrival time [second] | Maximum achieving voltage [V] |
|---|---|---|---|
| Comparative Example 29 | Diethylamine dimethyloctadecadienetetracarboxylate | 978 | 456 |

According to Tables 7 and 8, Examples 9 to 27 each are stable with a small fluctuation in 400 V arrival time, and have a largely shortened 400 V arrival time as compared to Comparative Examples 11 to 29. Accordingly, the effect of the function enhancing the chemical conversion capability by adding hypophosphorous acid or a salt thereof to the electrolytic solution is significant even in the case where the kind of the amine salt of the polycarboxylic acid is changed.

Cases where the molecular weight of the polycarboxylic acid was less than 140 were evaluated, but sufficient withstand voltage characteristics was not obtained. The production for the cases where the molecular weight of the polycarboxylic acid exceeded 500 was tried, but the sufficient solubility was not retained at a low temperature, and the specific resistance of the electrolytic solution was increased, failing to decrease the impedance sufficiently.

Subsequently, examples and reference examples having various contents of water will be described below.

The electrolytic solutions 2e of Examples 28 to 32 and electrolytic solutions of Reference Examples 3 and 4 each contained ethylene glycol, water, and 9% by mass of an amine salt of a polycarboxylic acid, to which 0.3% by mass of hypophosphorous acid or a salt thereof was added, and the electrolytic solutions produced each were subjected to the sparking voltage measurement for evaluating the 400 V arrival time (second). The 400 V arrival times of the electrolytic solutions 2e of the examples and the electrolytic solutions of the reference examples each were assumed to be T1. Electrolytic solutions under the same condition except that hypophosphorous acid or a salt thereof was not added each were subjected to the sparking voltage measurement for evaluating the 400 V arrival time (second), and assuming that the 400 V arrival times of the electrolytic solutions each were T2, the reduction rate of 400 V arrival time (%) was calculated based on the 400 V arrival time T2 (reduction rate of 400 V arrival time=100×(T2−T1)/T2). The results are shown in Table 9 below.

TABLE 9

| | Water [wt %] | Reduction rate of 400 V arrival time [%] |
|---|---|---|
| Example 28 | 10 | 59.7 |
| Example 29 | 15 | 57.3 |
| Example 30 | 20 | 52.8 |
| Example 31 | 25 | 38.8 |
| Example 32 | 30 | 20.5 |
| Reference Example 3 | 35 | −68.9 |
| Reference Example 4 | 40 | −99.6 |

According to Table 9, Examples 28 to 32 each have a reduction rate of 400 V arrival time of 20% or more. On the other hand, Reference Examples 3 and 4 each have a negative value for the reduction rate of 400 V arrival time. Accordingly, the significant effect of the function enhancing the chemical conversion capability is obtained through the synergistic effect of the content of water changed within a range of 10 to 30% by mass, and the addition of the appropriate amount of hypophosphorous acid or a salt thereof to the electrolytic solution 2e.

Cases where the content of water was less than 10% by mass were tried to evaluate, but the specific resistance of the electrolytic solution was increased, and the impedance was not sufficiently decreased.

Subsequently, the capability evaluation results necessary for applying the anode foils 2a with a variety of the products of the film withstand voltage and the capacitance per unit projected area to electrolytic capacitors will be described below.

The electrolytic solutions 2e of Examples 33 and 34 each contained ethylene glycol, water, and 12% by mass of an amine salt of a polycarboxylic acid, to which 0.3% by mass of hypophosphorous acid or a salt thereof was added, and the electrolytic solutions 2e produced for the examples each were subjected to the sparking voltage measurement for evaluating the 400 V arrival time (second). The 400 V arrival times of the electrolytic solutions 2e of Examples 33 and 34 each were assumed to be T3. Electrolytic solutions under the same condition except that hypophosphorous acid or a salt thereof was not added each were subjected to the sparking voltage measurement for evaluating the 400 V arrival time (second), and assuming that the 400 V arrival times of the electrolytic solutions each were T4, the reduction rate of 400 V arrival time (%) was calculated based on the 400 V arrival time T4 (reduction rate of 400 V arrival time=100×(T4−T3)/T4). The results are shown in Table 10 below.

TABLE 10

| | Product of film withstand voltage and capacitance per unit projected area [V · μF/cm$^2$] | Reduction rate of 400 V arrival time [%] |
|---|---|---|
| Example 33 | 303 | 50.3 |
| Example 34 | 208 | 39.8 |

According to Table 10, Examples 33 and 34 each have a reduction rate of 400 V arrival time of 20% or more. This shows that even in the case where the product of the film withstand voltage and the capacitance per unit projected area of the anode foil is less than 300, the significant effect of the function enhancing the chemical conversion capability can be obtained by adding the appropriate amount of hypophosphorous acid or a salt thereof to the electrolytic solution 2e. Furthermore, the reduction rate of 400 V arrival time of Example 33 is larger approximately 1.26 times the reduction rate of 400 V arrival time of Example 34. Accordingly, the further significant effect of the function enhancing the chemical conversion capability can be obtained through the synergistic effect of the use of the anode foil having a product of the film withstand voltage and the capacitance per unit projected area of 300 V·μF/cm$^2$ or more, and the addition of hypophosphorous acid or a salt thereof to the electrolytic solution 2e.

The present invention is not limited to the aforementioned examples, and may be subjected to various modifications unless the modifications deviate from the present invention.

What is claimed is:

1. An electrolytic capacitor for high withstand voltage including a winding capacitor element including an anode foil having formed thereon an oxide film, a cathode foil, and a separator disposed between the anode foil and the cathode foil, and an electrolytic solution introduced to the winding capacitor element, the electrolytic solution containing ethylene glycol, 10 to 25% by mass of water, and 1 to 12% by mass of an amine salt of a carboxylic acid, having added thereto 0.05 to 1% by mass of one or more kind of ammonium hypophosphite, an amine salt of hypophosphorous acid, and hypophosphorous acid, and having added thereto at least one of phosphoric acid, ammonium phosphate, and an amine salt of phosphoric acid, the carboxylic acid being a polycarboxylic acid having a chain hydrocarbon skeleton and a molecular weight of 140 to 240.

2. The electrolytic capacitor according to claim 1, wherein the anode foil is an etched aluminum foil having a product of a film withstand voltage and a capacitance per unit projected area of 300 V·μF/cm$^2$ or more, and the electrolytic capacitor has a withstand voltage of 400 V or more.

3. The electrolytic capacitor according to claim 1, wherein the amine salt of the carboxylic acid is one or more kind selected from dimethylamine adipate, diethylamine adipate, dimethylamine 2-methylnonanedioate, diethylamine 2-methylnonanedioate, dimethylamine 3-tert-butylhexanedioate, diethylamine 3-tert-butylhexanedioate.

4. The electrolytic capacitor according to claim 1, wherein the amine salt of the carboxylic acid is one or more kind selected from dimethylamine adipate, diethylamine adipate, dimethylamine azelate, diethylamine azelate, dimethylamine sebacate, diethylamine sebacate, ethyldimethylamine sebacate, dimethylamine 2-methylnonanedioate, diethylamine 2-methylnonanedioate, dimethylamine 3-tert-butylhexanedioate, diethylamine 3-tert-butylhexanedioate, dimethylamine 1,6-decanedicarboxylate, diethylamine 1,6-decanedicarboxylate.

* * * * *